Patented Jan. 11, 1938

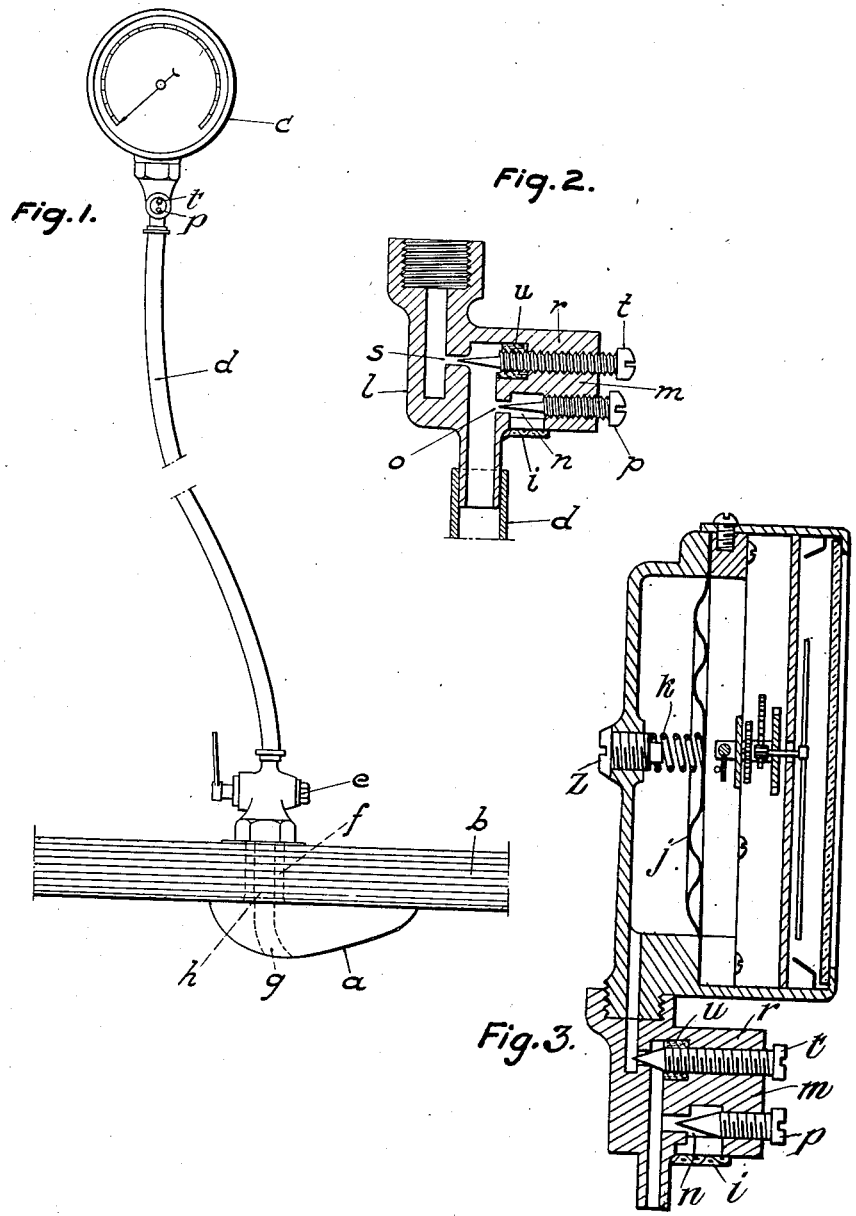

2,105,311

UNITED STATES PATENT OFFICE 2,105,311

SPEED INDICATOR FOR WATERCRAFT

Jan Carl Clason, Stockholm, Sweden, assignor to Aktiebolaget Asmega Agenturer, Stockholm, Sweden Application April 4, 1934, Serial No. 719,052
In Sweden April 7, 1933

4 Claims. (Cl. 73—122)

This invention relates to speed indicators for water craft, particularly for motor and sailing boats, and is concerned with improvements in that type of apparatus which comprises a suction device fixed to the hull on the outside below the water line and operative, owing to the motion through the water, to set up suction in a pipe or connection leading to a gauge or meter adapted for indicating speed. In this type of apparatus a small orifice has been provided for the admission of air into the vacuum tube to render the action of the pointer or index more sensitive, such orifice being always constant.

The object of the invention is to provide improved apparatus of reliable and robust construction, adjustable to suit running conditions in simple and effective manner and capable of giving steady reading under varied conditions and particularly in heavy seas.

According to these improvements, the speed-indicating apparatus for water craft comprises a shaped suction head adapted to operate by reason of the water stream flowing past or over it and not through it, the said suction head being fitted on the outside of the vessel below the water line and having a port or aperture at about its most protuberant part, a partial vacuum being set up at such port owing to the stream flow past it during forward movement of the vessel, and the said partial vacuum being readable on a gauge or meter connected by means of piping with the suction head. In such an apparatus, the suction head can be fitted flat on the outside of the hull and is less liable to damage in use and, since the water stream does not flow through the suction device, it is not liable to become choked by weeds, grit or other matter. In addition, the speed-indicating apparatus may comprise a suction head adapted for being fitted on the outside of the vessel below the water line, a speed-indicating gauge or meter connected by means of piping with the suction head, said piping having one opening for admission of air, and means for adjusting the air opening in size, in order to regulate the suction conditions in the piping and the gauge or meter. The adjustability of such opening is of advantage for calibration purposes and is a useful control over air admitted to the piping to prevent erroneous speed indication. There may be a contraction in the piping at a point between the air opening and the gauge or meter for the purpose of damping fluctuating pressure conditions and steadying the reading of the gauge hand and means may be provided for regulating the effective cross-section of the piping at such a point. Means such as an adjustable spring loading of the aneroid device may be associated with the gauge or meter for adjusting differences of pressure due to differences of depth below the water surface of the suction head.

In order to enable the invention to be readily understood reference is directed to the accompanying drawing in which:—

Figure 1 illustrates one form of the speed indicating apparatus in elevation and applied to the bottom of a vessel.

Figure 2 is a cross-section to a larger scale of a regulator device fitted in the pipe or connection between the suction head and the vacuum gauge or meter, and Fig. 3 is a cross-section to a larger scale of a device for an adjustable spring loading for zero adjustment of the aneroid.

In Figure 1, $a$ is a suction head fitted flat on the outside of the bottom $b$ of a vessel, $c$ a vacuum gauge or meter installed within the vessel and $d$ a pressure-piping connection between the suction head and the meter. There may also be a shut-off cock $e$ which screws on to a bushing $f$ of the suction head and clamps the latter to the bottom $b$ at a suitable aperture therein. The suction head is shaped with a relatively steeply inclined front wall curving into a rear wall which tails away at a smaller inclination. Both walls have a contour the central portions of which are each concaved downward when seen in vertical cross-section and between the two, that is at about the most protuberant part of the suction head, is a curved slit or port $g$, see Figure 1, which communicates by a passage $h$ with the bore of the bushing $f$. The port $g$ is preferably in the concave portion. The concave central portion of the surface of the head extends the entire distance of the head from front to rear and presents what might be described as a partial Venturi surface. Unlike a Venturi tube, however, the surface of the device described herein has nothing which tends to clog. It is, on the other hand, self-cleaning. The position of the suction head on the hull is dependent upon the type of vessel to be fitted. With the round bottomed type of hull it should be situated where the vessel sits comfortably on the water in the neighbourhood of mid-ship. With the speed-boat design of hull, it should be situated aft at such a spot that it is at no time out of the water, even when travelling at the highest speed. The depth of the suction head under the surface of the water should not be less than twelve inches, and it should be fixed so that the steeper front wall faces the bow of the boat. As shown in the drawing the suction head has a streamlined exterior surface to which the port g is located in such relation that water may pass past the port at backward as well as at forward motion of the vessel. The cock e may normally remain open in which position the handle conveniently lies parallel with the pipe d and the pipe is led upwardly from the cock to the vacuum gauge or meter c above the water level.

In operation, vacuum is set up at the port g of the suction head a in consequence of water stream flowing past or over it during the vessel's motion through the water, and this is communicated through the pipe d to the vacuum gauge or meter c on which it may be read off. However, as for every speed of travel of the vessel there is a corresponding degree of vacuum or under-pressure, the dial of the meter is preferably graduated in such manner that the speed of the vessel can be read off directly thereon. For instance the meter may have a scale graduated in knots or in land miles per hour.

In practice it is of considerable value to fit the apparatus, above the water level, with a regulating device by means of which the pipe or connection d can be made to communicate through a small controllable aperture with the outer air. As seen in Figure 2, a device l for this purpose may comprise an integral valve casing part m with an aperture n opening to the atmosphere and another aperture o communicating with aperture n and opening to the pipe or connection d, and a valve member in the form of a screw p with coned extremity adjustable in the aperture o. The aperture n may be covered with gauze i to keep out foreign matter. As the vessel moves forward and vacuum arises in the pipe d air begins to be drawn in through the small aperture o and when the speed of the vessel reaches a certain value, this air is aspirated through the suction head a. As a result, the pipe is always filled with air and owing to this it is possible to avoid sources of erroneous speed indication, such as may readily occur when the pipe is closed from the air and thus liable to become more or less filled with water on decrease of speed. By this means not only is the speed meter rendered far more reliable, but by projecting the coned end of the screw p to a greater or less extent, the dimension of the aperture o can be varied and the suction in the pipe d and thus the effect on the speed meter c can be controlled, for example for calibration purposes. Means such as an adjustable spring loading of the aneroid device, may be associated with the gauge or meter for zero adjustments. With different vessels, the suction head may lie at slightly different depths below the water line and this zero adjusting means allows the differences of pressure due to the differences of depth to be accommodated, see Fig. 3. In Fig. 3 j is the membrane of the aneroid device, k is a spring loading the membrane and z is a screw for adjusting the load of the spring and for zero adjustment of the aneroid at different depths of the suction head. A further adjustment illustrated in th drawing is a valve for regulating the effective cross-section of the pipe or connection d at a point between the air admission aperture o and the gauge or meter c. This valve may be embodied in the regulating device l and may suitably comprise a valve casing part r with a small aperture s controlled by the coned extremity of a screw t. By projecting this coned extremity and thereby making the aperture s very small, any fluctuations of pressure will be damped in passing the fine opening, and in this way the gauge or meter c will be made to give a steady reading. The screw t may be packed by a washer or washers u. The screw p in conjunction with the zero adjustment, enables the speed meter to be fitted to any type of boat and adjusted to ensure the exact reading being given on the meter. Before calibration, the vessel is first run at full speed over a known distance, for example one sea mile. During this run, the screw p is roughly adjusted for highest speed. After the run the zeroizing means is adjusted to the lowest speed indication and then, during a final run, a final and fine adjustment of the screw p is made and the meter is then ready for use.

What I claim is:—

1. Speed indicator for water craft having a suction head adapted for being placed on the outside of a vessel below the water line, a vacuum meter and a conduit connecting the suction head with the vacuum meter, said suction head being provided with a passage communicating with the conduit and ending in a port in the outside of the head, said head being streamlined and said port being located on the top of the streamlined head, which lets the water pass past the port at forward as well as at backward motion of the vessel, there being an opening for admission of air in the conduit and means for adjusting the size of the air opening, a constriction in the conduit at a point between the opening and the vacuum meter, said vacuum meter having means for compensating for differences in pressure due to the differences in depth below the water surface of the suction head.

2. A device for indicating the relative speed between an object and a fluid adjacent that object comprising a suction head adapted to be fitted against the exterior of an object, the outermost surface of said head being generally protuberant from the part of the head which is to be fitted to an object, said outermost surface having an opening therethrough and having a contour in the direction of relative motion between said head and said fluid, which contour changes in direction in the region of said opening in such fashion that the tangents to said contour at the edge of said opening lie substantially away from said opening, a pressure indicator and means providing a passage from said opening to said indicator.

3. A device for indicating the relative speed between an object and a fluid adjacent that object comprising a suction head adapted to be fitted against the exterior of an object, the outermost surface of said head being generally protuberant from the part of the head which is to be fitted to an object, said surface having a trough-like concavity extending along said surface and in the direction of relative motion between said head and said fluid, said surface in the concave portion thereof having an opening therethrough, said concavity having a contour which changes in direction in the region of said opening in such fashion that the tangents to said contour at the edge of said opening lie substantially away from said opening, a pressure indicator and means providing a passage from said opening to said indicator.

4. A device for indicating the relative speed between an object and a fluid adjacent that object comprising a suction head adapted to be fitted against the exterior of an object, the outermost surface of said head being generally protuberant from the part of the head which is to be fitted to an object, said surface having a trough-like concavity extending along said surface and in the direction of relative motion between said head and said fluid, said surface in the concave portion thereof having an opening therethrough, said concavity having a contour which changes in direction in the region of said opening in such fashion that the tangents to said contour at the edge of said opening lie substantially away from said opening, a pressure indicator and means providing a passage from said opening to said indicator, the direction of slope of said concave portion relative to the motion of said fluid being at a greater angle therewith on one side of said opening than on the other and said opening lying adjacent and substantially at the apex of said contour.

JAN CARL CLASON.